(12) United States Patent
Spencer, Sr. et al.

(10) Patent No.: US 7,093,387 B1
(45) Date of Patent: Aug. 22, 2006

(54) FISH LURING SYSTEM

(76) Inventors: Kenneth R. Spencer, Sr., 8825 Karen's Corner, Alvarado, TX (US) 76009; Steven O. Moon, Sr., 308 N. Retta, Ft. Worth, TX (US) 76111

( * ) Notice: Subject to any disclaimer, the term of this patent is extended or adjusted under 35 U.S.C. 154(b) by 0 days.

(21) Appl. No.: 10/043,518

(22) Filed: Jan. 11, 2002

(51) Int. Cl.
*A01K 97/10* (2006.01)

(52) U.S. Cl. .................................................. 43/19.2
(58) Field of Classification Search ............... 43/19.2, 43/18.1, 26.1, 4.5, 24, 25; D22/143
See application file for complete search history.

(56) References Cited

U.S. PATENT DOCUMENTS

| 2,746,198 | A | | 5/1956 | Smith |
| 3,001,317 | A | | 9/1961 | Boughton |
| 3,789,534 | A | | 2/1974 | Yankaitis |
| 7,893,534 | | * | 2/1974 | Yankaitis ............... 43/19.2 |
| 3,839,810 | A | * | 10/1974 | Lagasse ................. 43/19.2 |
| 3,955,303 | A | | 5/1976 | Outlaw et al. |
| 3,981,095 | A | | 9/1976 | Shepherd |
| 4,020,582 | A | | 5/1977 | Thelen |
| 4,051,616 | A | | 10/1977 | Mathauser |
| 4,084,342 | A | | 4/1978 | Philip |
| D256,839 | S | * | 9/1980 | Endo et al. .............. D22/142 |
| 4,349,978 | A | | 9/1982 | Philip |
| 4,700,501 | A | | 10/1987 | Bryan |
| 4,821,448 | A | | 4/1989 | Lindaberry |
| 4,864,763 | A | | 9/1989 | Peikin |
| 5,036,616 | A | | 8/1991 | Wilsey |
| D325,421 | S | | 4/1992 | Yasui |
| 5,195,267 | A | * | 3/1993 | Daniels ..................... 43/15 |
| D346,197 | S | * | 4/1994 | Onishi et al. ............. D22/142 |
| 5,540,010 | A | * | 7/1996 | Aragona .................. 43/19.2 |
| 6,282,830 | B1 | * | 9/2001 | Henry ..................... 43/19.2 |
| 6,363,650 | B1 | | 4/2002 | Beeler |
| 6,410,380 | B1 | * | 6/2002 | Edgar ....................... 438/238 |

FOREIGN PATENT DOCUMENTS

GB 2241140 A * 2/1991

* cited by examiner

*Primary Examiner*—Kurt Rowan
(74) *Attorney, Agent, or Firm*—Jenkens & Gilchrist, P.C.

(57) ABSTRACT

A fish luring system for luring fish to a fishing lure attached to an end of a fishing line attached to the fishing pole. The fish luring system includes a fishing pole that includes a rod portion and a handle portion. A plurality of eyelets is mounted on the rod portion and a vibrating assembly for vibrating the rod portion of the fishing pole is mounted in the fishing pole.

23 Claims, 7 Drawing Sheets

FISH LURING SYSTEM

BACKGROUND OF THE INVENTION

1. Field of the Invention

The present invention relates to fishing poles and more particularly pertains to a new fish luring system for luring fish to a fishing lure attached to an end of a fishing line attached to the fishing pole.

2. Description of the Prior Art

The use of fishing poles is known in the prior art. More specifically, fishing poles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,789,534; U.S. Pat. No. 4,700,501; U.S. Pat. No. 4,700,501; U.S. Pat. No. 3,981,095; U.S. Pat. No. 3,955,303; and U.S. Pat. No. Des. 325,421.

While these devices fulfill their respective, particular objectives and requirements, the aforementioned patents do not disclose a new fish luring system. The inventive device includes a fishing pole that includes a rod portion and a handle portion. A plurality of eyelets is mounted on the rod portion and a vibrating assembly for vibrating the rod portion of the fishing pole is mounted in the fishing pole.

In these respects, the fish luring system according to the present invention substantially departs from the conventional concepts and designs of the prior art, and in so doing provides an apparatus primarily developed for the purpose of luring fish to a fishing lure attached to an end of a fishing line attached to the fishing pole.

SUMMARY OF THE INVENTION

In view of the foregoing disadvantages inherent in the known types of fishing poles now present in the prior art, the present invention provides a new fish luring system construction wherein the same can be utilized for luring fish to a fishing lure attached to an end of a fishing line attached to the fishing pole.

The general purpose of the present invention, which will be described subsequently in greater detail, is to provide a new fish luring system apparatus and method which has many of the advantages of the fishing poles mentioned heretofore and many novel features that result in a new fish luring system which is not anticipated, rendered obvious, suggested, or even implied by any of the prior art fishing poles, either alone or in any combination thereof.

To attain this, the present invention generally comprises a fishing pole that includes a rod portion and a handle portion. A plurality of eyelets is mounted on the rod portion and a vibrating assembly for vibrating the rod portion of the fishing pole is mounted in the fishing pole.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish luring system apparatus and method which has many of the advantages of the fishing poles mentioned heretofore and many novel features that result in a new fish luring system which is not anticipated, rendered obvious, suggested, or even implied by any of the prior art fishing poles, either alone or in any combination thereof.

It is another object of the present invention to provide a new fish luring system which may be easily and efficiently manufactured and marketed.

It is a further object of the present invention to provide a new fish luring system which is of a durable and reliable construction.

An even further object of the present invention is to provide a new fish luring system which is susceptible of a low cost of manufacture with regard to both materials and labor, and which accordingly is then susceptible of low prices of sale to the consuming public, thereby making such fish luring system economically available to the buying public.

Still yet another object of the present invention is to provide a new fish luring system which provides in the apparatuses and methods of the prior art some of the advantages thereof, while simultaneously overcoming some of the disadvantages normally associated therewith.

Still another object of the present invention is to provide a new fish luring system for luring fish to a fishing lure attached to an end of a fishing line attached to the fishing pole.

Yet another object of the present invention is to provide a new fish luring system which includes a fishing pole that includes a rod portion and a handle portion. A plurality of eyelets is mounted on the rod portion and a vibrating assembly for vibrating the rod portion of the fishing pole is mounted in the fishing pole.

Still yet another object of the present invention is to provide a new fish luring system that increases the chances of a user attracting and catching a fish. The present invention vibrates a fishing pole, which in turn vibrates a fishing lure on the end of a fishing line connected to the fishing pole. Since fish are attracted to movement, the vibrating fishing lure attracts and invokes the fish to strike the fishing lure.

Even still another object of the present invention is to provide a new fish luring system that reduces the cost of fishing for a user. The vibrating assembly in the fishing pole adds increased movement to any fishing lure attached to the end of the fishing line attached to the fishing pole. The added movement means that a user will be able to use existing fishing lures without having to purchase expensive fishing lures designed to attract fish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
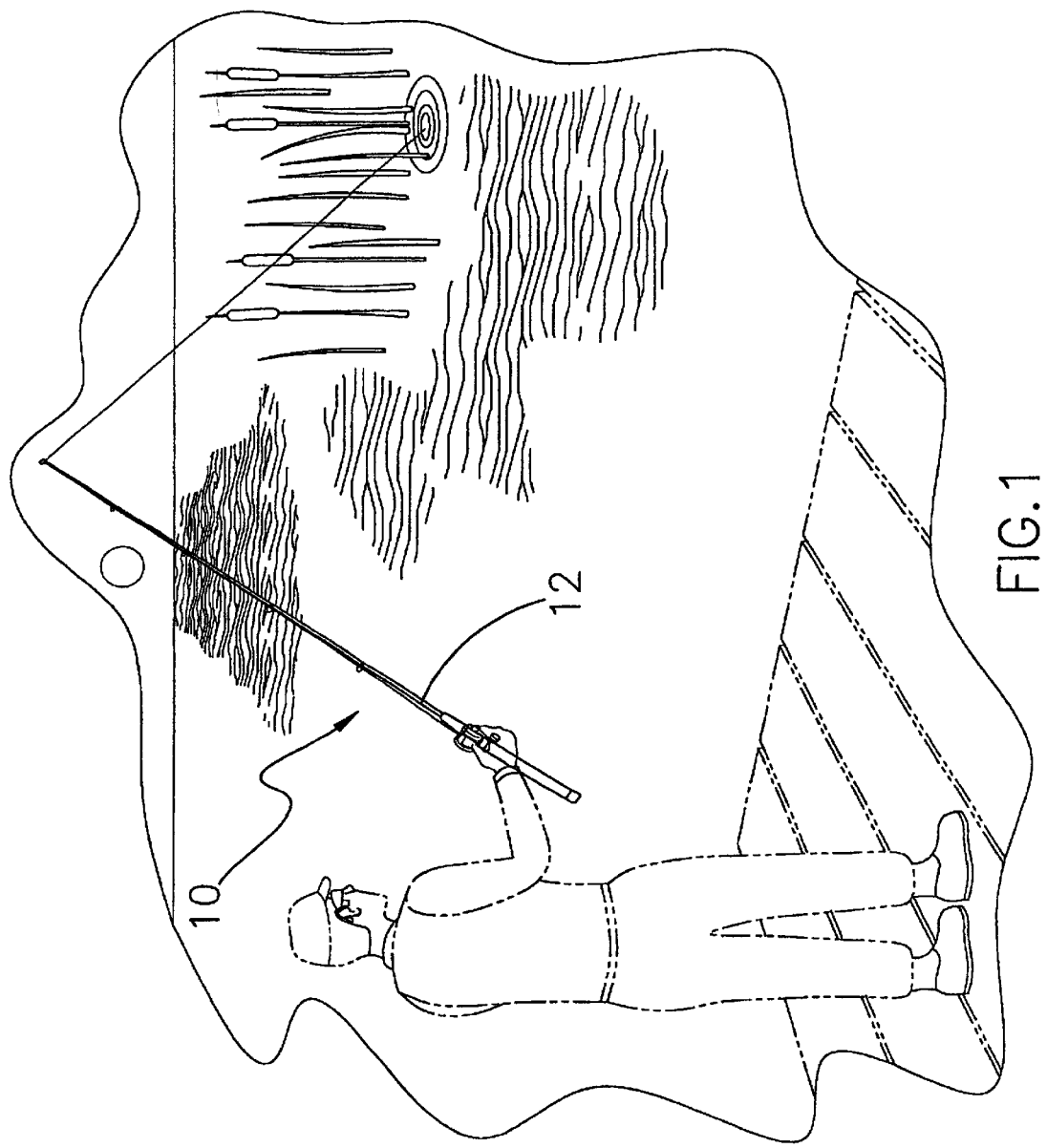
FIG. 1 is a schematic view of a new fish luring system according to the present invention in use.
Figure 2:
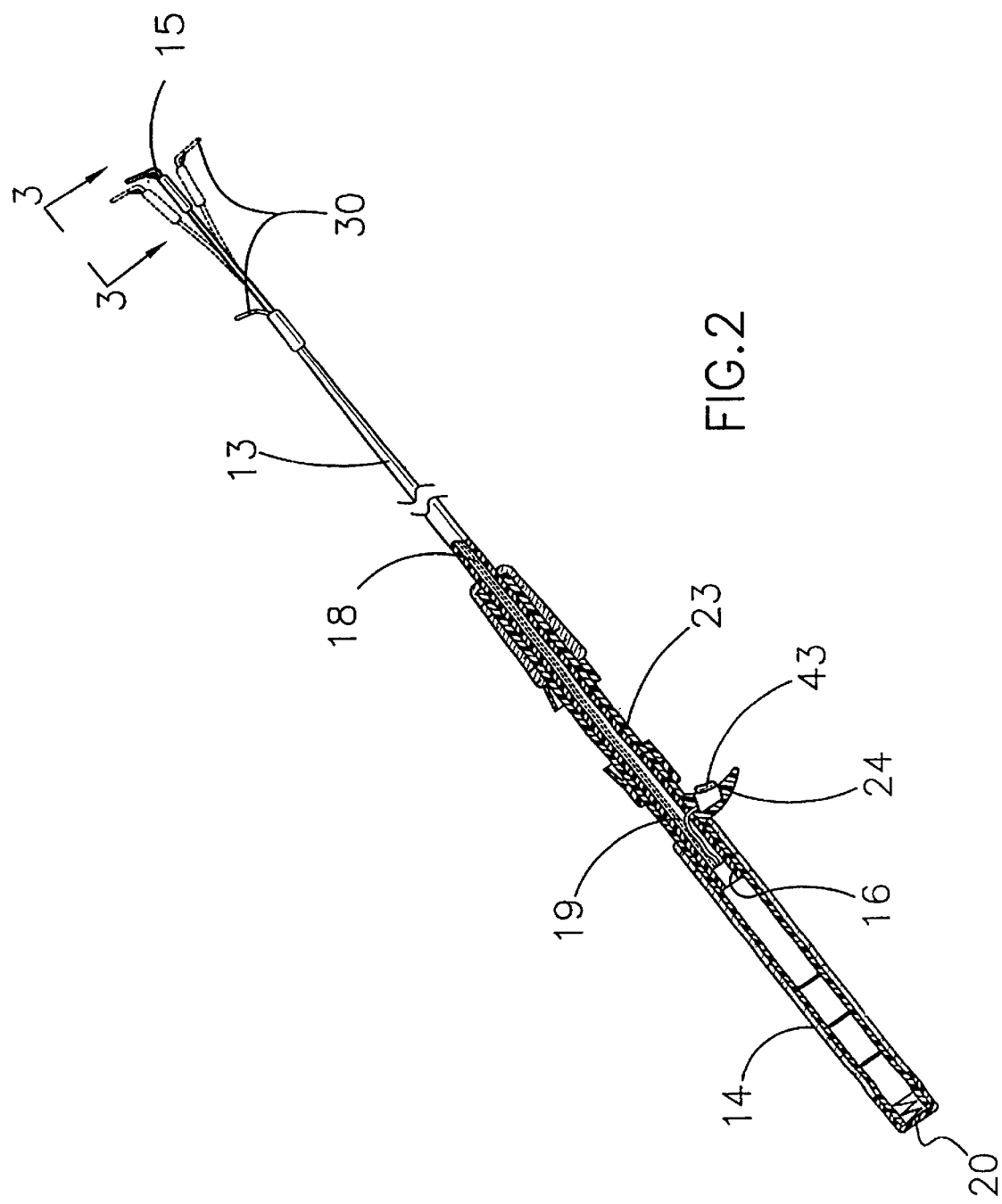
FIG. 2 is a cross-sectional view of the present invention.
Figure 3:
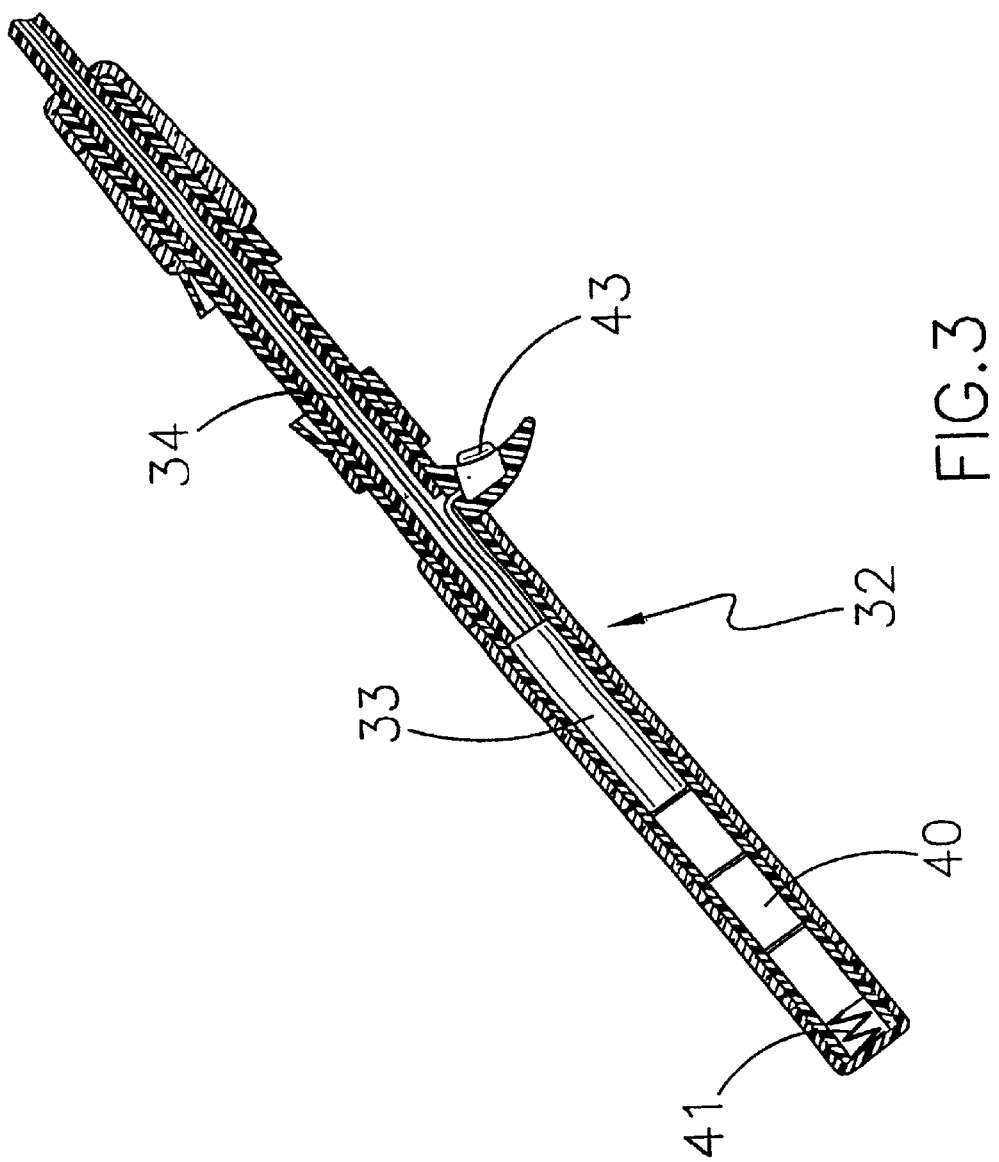
FIG. 3 is a schematic cross-sectional detail view of the present invention.

With reference now to the drawings, and in particular to FIGS. 1 through 7 thereof, a new fish luring system embodying the principles and concepts of the present invention and generally designated by the reference numeral 10 will be described.

As best illustrated in FIGS. 1 through 7, the fish luring system 10 generally comprises a fishing pole 12 that includes a rod portion 13 and a handle portion 14. The rod portion 13 includes a first end 15 and a second end 16. The second end 16 of the rod portion 13 may include a channel 18 extending into the rod portion 13. The channel 18 preferably extends along a longitudinal axis of the rod portion 13.

The handle portion 14 is mounted on the second end 16 of the rod portion 13. The handle portion 14 preferably includes an interior 19 with an open end 20 extending into the interior 19 of the handle portion 14. The interior 19 of the handle portion 14 is in communication with the channel 18 extending through the rod portion 13 of the fishing pole 12.

A protruding member 22 may be provided for selectively supporting a finger of a user. The protruding member 22 may extend away from a peripheral wall 23 of the handle portion 14. The protruding member 22 may include a width tapering from the handle portion 14 toward an end 24 of the protruding member 22.

A cap 26 may be provided for selectively closing the open end 20 of the handle portion 14. As particularly illustrated in FIG. 4, the cap 26 may include an inner surface 27. The inner surface 27 of the cap 26 may be threadedly coupled to an outer surface 28 of the handle portion 14 adjacent to the open end 20 of the handle portion 14.

A plurality of eyelets 30 are mounted on the rod portion 13. Each of the eyelets 30 is spaced apart from each other along a length of the rod portion 13. Each of the eyelets 30 is in registration with each other.

A vibrating assembly 32 is provided for vibrating the fishing pole 12. The vibrating assembly 32 may include a motor 33 that is designed for rotational movement. The motor 32 may be mounted in the interior 19 of the handle portion 14.

A motor shaft 34 may be rotatably coupled to and extending from the motor 33 toward the first end 15 of the rod portion 13. The motor shaft 34 is elongated and is preferably positioned in the channel 18 extending through the rod portion 13. The motor shaft 34 may comprise a substantially rigid material such as, for example, a steel, aluminum or plastic material.

Figure 4:
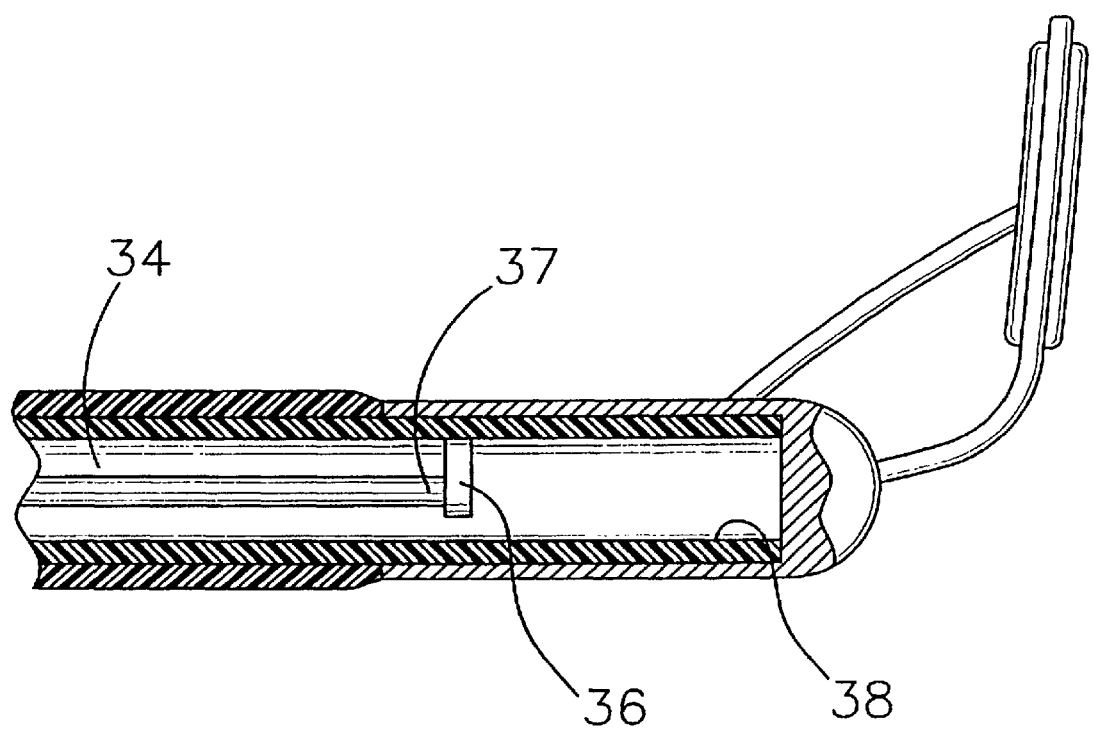
FIG. 4 is a schematic cross-sectional detail view of the first end of the rod portion of the present invention.

As particularly illustrated in FIG. 4, a cam 36 or an offset angled end is formed on an end 37 of the motor shaft 34 for selectively engaging an inner surface 38 of the channel 18 extending through the rod portion 13. In one embodiment of the present invention, rotational movement of the motor shaft 34 by the motor 33 causes the cam 36 to vibrate the first end 15 of the rod portion 13. In one embodiment of the present invention, vibration of the first end 15 of the rod portion 13 vibrates the fishing line and any lure attached to the fishing line with the overall intent to attract fish.

The end of the motor shaft 37 mounted on the cam 36 is preferably positioned generally adjacent to a central portion of the cam 36 such that the cam 36 travels in an eccentric circle when rotated by the motor shaft 34. In one embodiment of the present invention, the cam 36 selectively engages the inner surface 38 of said channel 18 in the rod portion 13 of the fishing rod 12. The cam 36 causes the first end 15 of the rod portion 13 to vibrate. The vibration of the first end 15 of the rod portion 13 vibrates the fishing line and any fishing lure attached to the fishing line. The cam 36 may comprise a substantially rigid material such as, for example, a steel or plastic material.

A power supply 40 may be provided for selectively providing power to the motor 33. The power supply 40 may be mounted in the interior 19 of the handle portion 14 and may be electrically connected to the motor 33. The power supply 40 may comprise a battery.

A biasing member 41 may be provided for selectively biasing the power supply 40 away from the cap 26. The biasing member 41 may be attached to a bottom surface 42 of the cap 26 and may be positioned generally between the cap 26 and the power supply 40. The biasing member 41 may comprise a coiled spring.

A switch 42 may be provided for selectively controlling the motor 33. The switch 42 may be depressibly mounted on the protruding portion 22. The switch 42 may be electrically connected to the motor 33.

Figure 5:
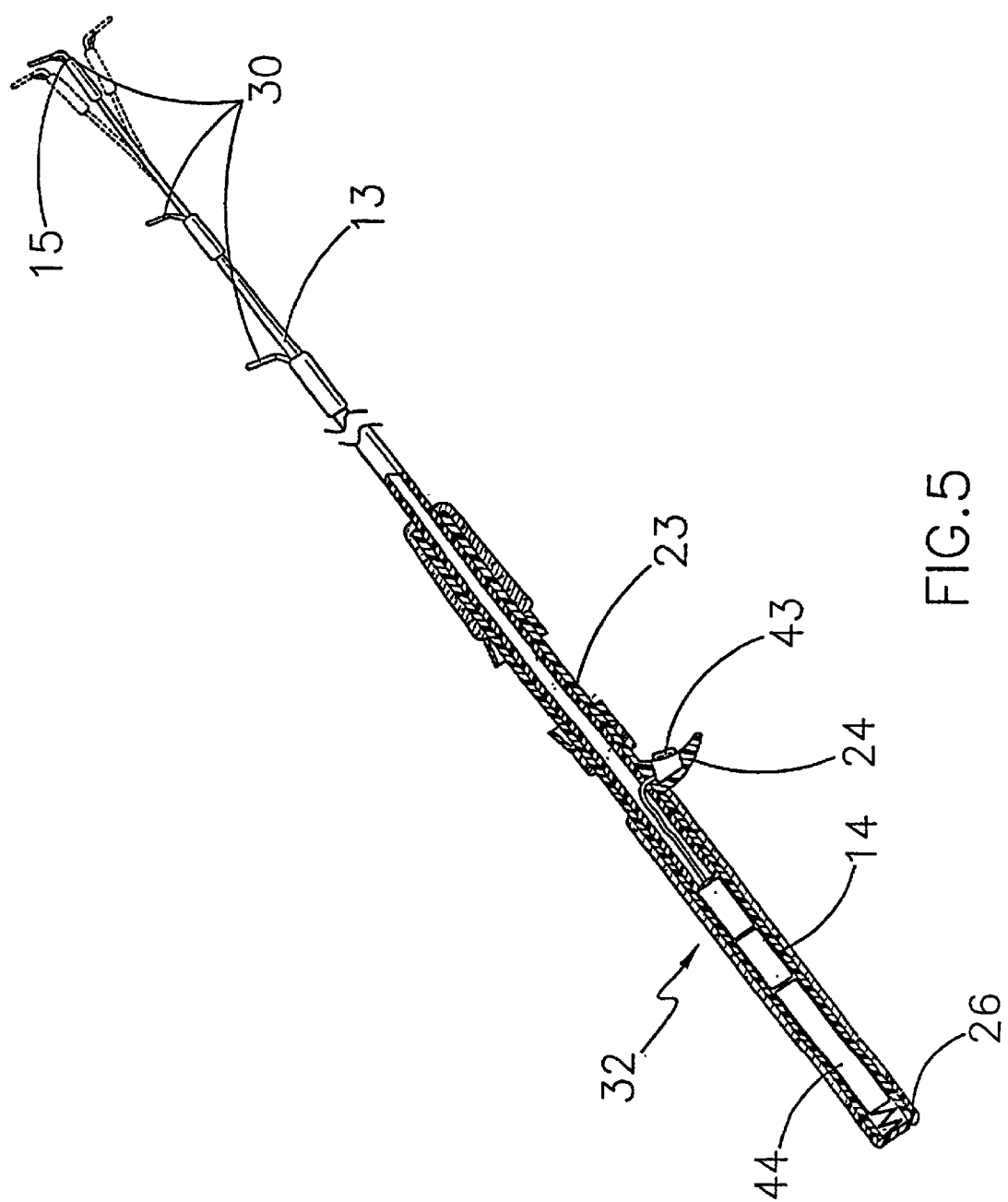
FIG. 5 is a schematic side view of an embodiment of the present invention.
Figure 6:
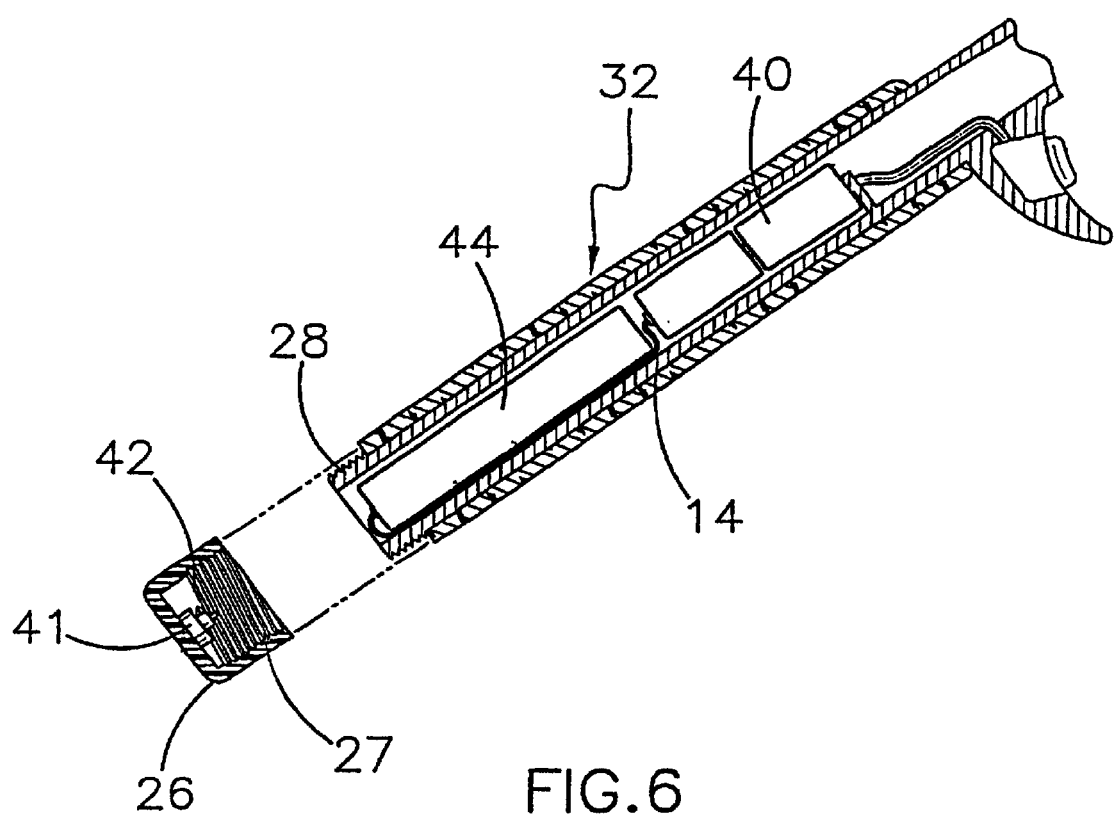
FIG. 6 is a schematic detailed cross-sectional view of the handle portion of the embodiment of the present invention shown in FIG. 5.

In an alternate embodiment of the present invention, as particularly illustrated in FIGS. 5 and 6, the vibrating assembly 32 may include a vibrating means 44 designed for vibrating the entire fishing pole 12. The vibrating means 44 may be mounted in the interior 19 of the handle portion 14 of the fishing pole 12.

Figure 7:
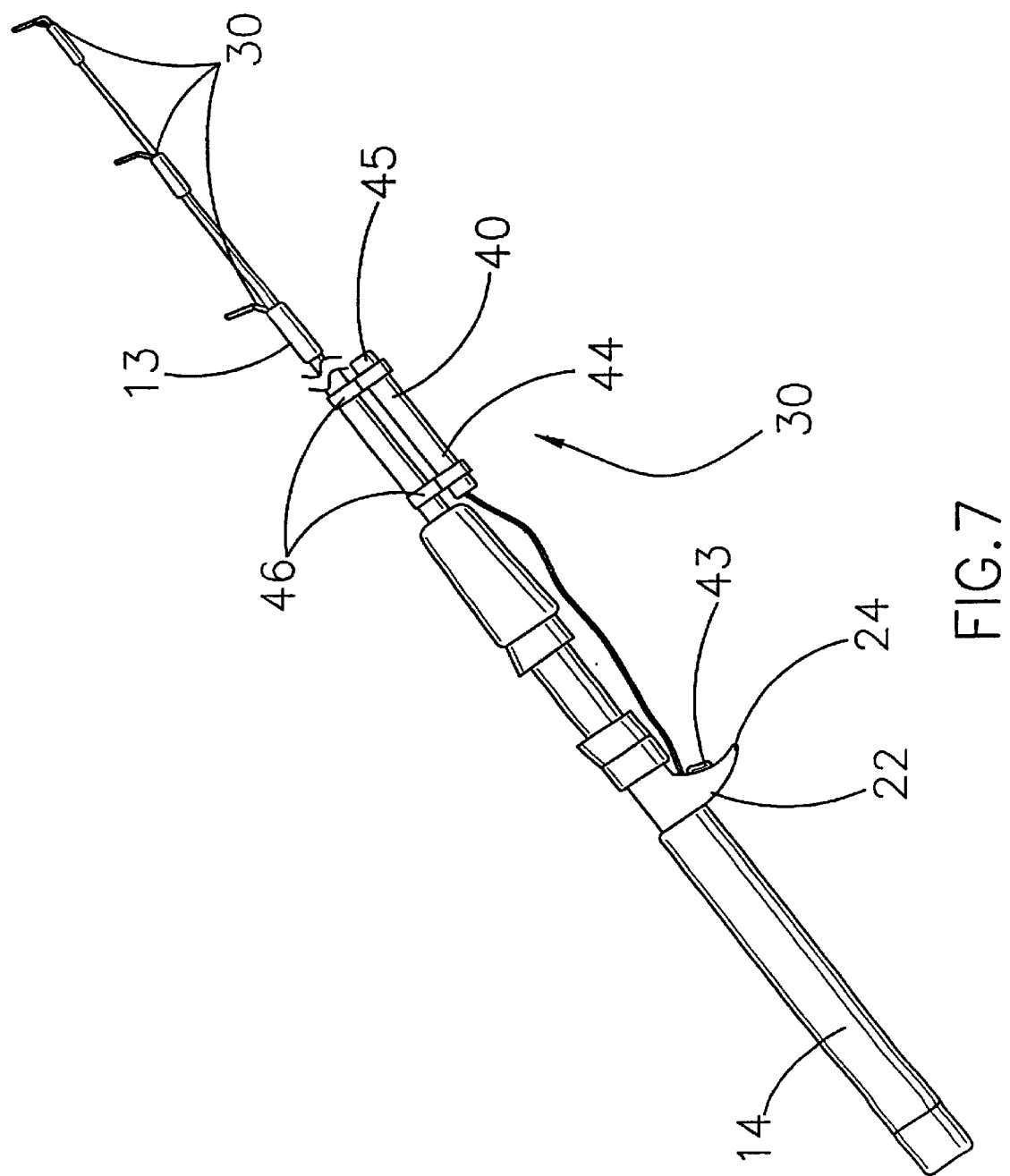
FIG. 7 is a schematic side view of an embodiment of the present invention.

In an alternate embodiment of the present invention, as particularly illustrated in FIG. 7, the vibrating assembly 32 may include a vibrating means 44 designed for vibrating the fishing pole 12. The vibrating means 44 is mounted within a housing 45. The housing 45 is removably coupled to the rod portion 13 of the fishing pole 12. A power supply 40 selectively provides power to the vibrating means 44. The power supply 40 is mounted in the housing 45. A switch 43 is operationally coupled between the vibrating means 44 and the power supply 40. The switch 43 is coupled to the handle portion 14 of the fishing pole 12. The switch 43 is for selectively controlling power from the power supply 40 to the to the vibrating means 44 when the switch 43 is actuated by a user. The housing 45 has a plurality of mounting portions 46. Each of the mounting portions 46 selectively couples to the rod portion 13 of the fishing pole 12. The mounting portions 46 are for transferring vibrations from the vibrating means 44 to the rod portion 13 of the fishing pole 12.

The power supply 40 mounts in the handle portion 14 of the fishing pole 12 may selectively provide power to the vibrating means 44. The switch 42 may be electrically connected to the vibrating means 44 for selectively control the vibrating means 44.

In use, a user depresses the switch 42 to control rotational movement of the motor 33. The motor 33 rotates the motor shaft 34 which causes the cam 36 to selectively engage the inner surface 38 of the channel 18 extending through the rod portion 13 of the fishing pole 12. The cam 36 selectively engaging the inner surface 38 of the channel 18 causes the first end 15 of the fishing pole to vibrate. The vibration of the first end 15 of the fishing pole 12 causes the fishing line and any attached lure to also vibrate.

In the alternate embodiment of the present invention, a user depresses the switch 42 to control vibration of the vibrating means 44. The vibrating means 44 causes the entire fishing pole 12 to vibrate. The vibrating fishing pole 12 vibrates any fishing reel, fishing line and lure that may be coupled to the fishing pole 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim

1. A fishing pole, comprising:
    a rod portion including eyelets for use in supporting a fishing line;
    a handle portion having a hollow interior space;
    a vibrating assembly mounted within the hollow interior space of the handle portion
    which, when activated, causes vibration to be initiated within the handle portion; and
    wherein the vibrating assembly is not physically connected to the supported fishing line and comprises:
        a motor having a rotating shaft; and
        an eccentric member mounted to, and rotated by, the shaft, the eccentric member positioned within the hollow interior space of the handle portion.

2. The fishing pole of claim 1 wherein the eccentric member comprises a cam.

3. The fishing pole of claim 1 further including an actuating means associated with the handle portion for actuating the vibrating assembly.

4. The fishing pole of claim 3 further comprising:
    a protruding member extending from the handle portion, the protruding member being adapted for selectively supporting a finger of a user; and
    wherein the actuating means is mounted on the prodruding member.

5. The fishing pole of claim 3 further wherein the actuating means is mounted to the handle portion in a position such that the actuating means is operable by a finger of a user.

6. A handle for a fishing pole, comprising:
    a hollow interior space within the handle;
    a vibrating assembly mounted within the hollow interior space of the handle portion which, when activated, causes vibration to be initiated within the handle itself; and
    wherein the vibrating assembly does not directly actuate any fishing line which is supported by the fishing pole and comprises:
        a motor having a rotating shaft; and
        an ecentric member mounted to, and rotated by, the shaft to effectuate the vibration within the handle, the eccentric member positioned within the hollow interior space of the handle.

7. The handle of claim 6 wherein the eccentric member comprises a cam.

8. The handle of claim 6 further including an actuating means associated with the handle for actuating the vibrating assembly.

9. A fish luring system, comprising:
    a fishing pole having a rod portion and a handle portion, said rod portion having a first end and a second end and a longitudinally extending channel, said handle portion being mounted to said second end of said rod portion, said handle portion having an interior space in communication with said longitudinally extending channel;
    a plurality of spaced-apart eyelets being mounted on said rod portion for supporting a fishing line;
    a vibrating assembly that does not directly actuate the supported fishing line comprising:
        a motor adapted for rotational movement, said motor being mounted in said interior space of said handle portion;
        a shaft being rotatably coupled to and extending from said motor;
        an eccentric member mounted to said shaft for vibratory rotation within said fishing pole, wherein the eccentric member is positioned within the interior space of the handle portion to cause vibration which initiated within the handle portion;
        a power supply for selectively providing power to said motor, said power supply being mounted in said interior space of said handle portion, said power supply being electrically connected to said motor; and
    a switch for selectively controlling said motor.

10. A fishing pole, comprising:
    a rod portion having an axially extending hollow cavity;
    a handle portion having a hollow interior space; and
    a vibrating assembly comprising:
        a motor mounted within the hollow interior space of the handle portion, the motor having a rotating shaft which extends into the hollow cavity of the rod portion; and
        an eccentric member mounted to the shaft at a position within the hollow cavity of the rod portion, the eccentric member being rotated by the shaft to cause vibration to be initiated within the rod portion, wherein the eccentric member engages an interior surface of the hollow cavity of the rod portion to induce vibratory movement of the rod portion.

11. The fishing pole of claim 10, wherein the eccentric member comprises a cam.

12. The fishing pole of claim 10, further including an actuating means associated with the handle portion for actuating the vibrating assembly.

13. The fishing pole of claim 12 wherein the shaft portion has a distal end, the rotating shaft extending proximate to the distal end, and the eccentric member engaging the interior surface of the hollow cavity of the rod portion proximate the distal end to cause vibration to be initiated at the distal end of the rod portion.

14. a fishing pole, comprising:
  a handle end;
  a tip end including at least one eyelet for supporting a fishing line; and
  a vibrating assembly positioned in an axially extending hollow cavity at the handle end of the fishing pole which, when activated, causes vibration to be initiated at the handle end of the fishing pole to effectuate vibration of the fishing pole but does not itself physically touch the supported fishing line; and
  wherein the vibrating assembly comprises:
    a motor having a rotating shaft; and
    an eccentric member mounted to, rotated by, and solely connected to, the rotating shaft to effectuate the vibration which is initiated at the handle end.

15. The fishing pole of claim 14, wherein the eccentric member comprises a cam.

16. The fishing pole of claim 14, further including an actuating means for actuating the vibrating assembly.

17. The fishing pole of claim 14, wherein the vibration of the fishing pole effectuates vibration of a fishing line coupled to the fishing pole.

18. A fishing pole, comprising:
  a handle end;
  a tip end for supporting a fishing line coupled to the fishing pole; and
  a vibrating assembly positioned in axially extending hollow cavity at the handle end of the fishing pole which, when activated, cause vibrating to be initiated at the handle end of the fishing pole to effectuate vibration of the fishing pole; and
  wherein the vibrating assembly comprises:
    a motor having a rotating shaft; and
    an eccentric member mounted to, and rotated by, the rotating shaft to effectuated the vibration which is initiated at the handle end, wherein the eccentric member does not include means for making physical contact with the fishing line for the purpose of moving the fishing line.

19. The fishing pole of claim 18, wherein the eccentric member comprises a cam.

20. The fishing pole of claim 18, further including an actuating means for actuating the vibrating assembly.

21. The fishing pole of claim 18, wherein the vibration of the fishing pole effectuates vibration of the fishing line coupled to the fishing pole.

22. The fishing pole of claim 20 further comprising:
  a protruding member extending from the handle end, the protruding member being adapted for selectively supported a finger of a user; and
  wherein the actuating means is mounted on the protruding member.

23. The fishing pole of claim 20, wherein the actuating means is mounted to the handle end in a position such that the actuating means is operable by a finger of a user.

* * * * *